Feb. 2, 1960     R. HERMITTE     2,923,756
STARTER DEVICE FOR STORAGE BATTERIES
Filed Oct. 26, 1956
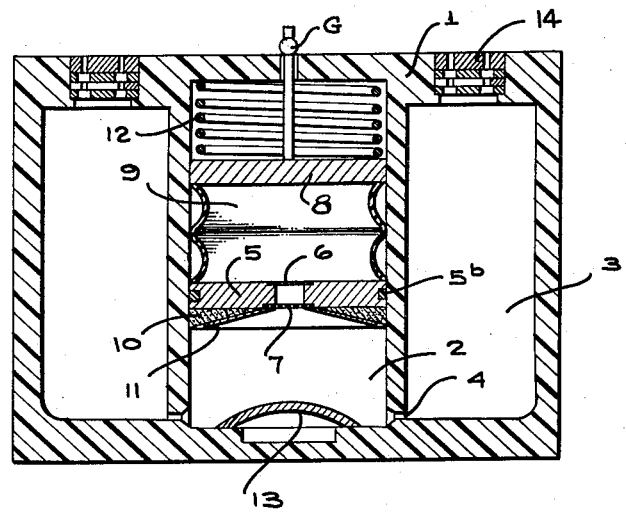
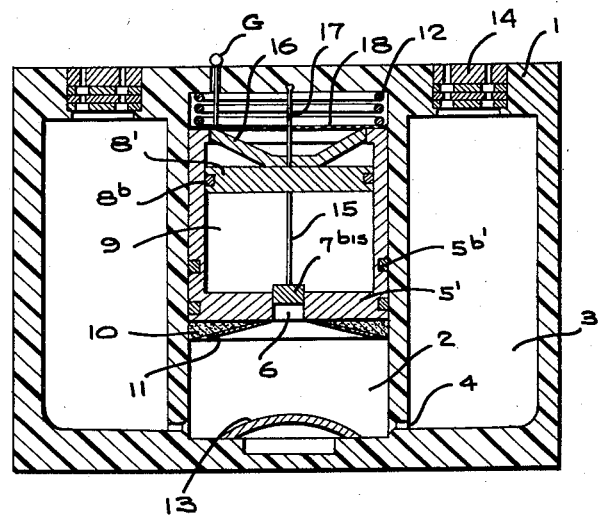
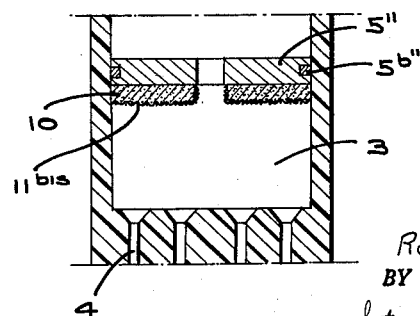
INVENTOR.
Rene Hermitte
BY
Stevens, Davis, Miller & Mosher
ATTORNEYS United States Patent Office 2,923,756
Patented Feb. 2, 1960

2,923,756

STARTER DEVICE FOR STORAGE BATTERIES

René Hermitte, Vanves, France

Application October 26, 1956, Serial No. 618,586

Claims priority, application France October 31, 1955

6 Claims. (Cl. 136—6)

This invention relates to electrical storage batteries and has particular reference to starter devices for initiating the operation of batteries.

A device of this character comprises essentially a chamber communicating at its bottom through adequate orifices with the various elementary cells or compartments of the battery. This chamber has slidably fitted therein a piston assembly containig in fluid tight fashion the electrolyte for the battery. This piston is provided with a plug and carries on its lower face a certain amount of grease retained by a suitable shaped flange and adapted, when the battery operation is initiated, to choke the aforesaid orifices through which the electrolyte had previously been distributed to the various cells of the battery.

Thus, with this device, it is possible:

(a) To regularly supply a plurality of cells constituting separate storage batteries, in series or in parallel, with the electrolyte required for starting their operation;

(b) Upon completion of the starting process, to choke up any passages through which the electrolyte may have been supplied to the cells, thereby avoiding any undesired short-circuit between the battery forming cells.

Other features of this invention will appear as the following description proceeds with reference to the attached drawings forming part of this specification and illustrating diagrammatically by way of example an accumulator or storage battery adapted to be started by the device of this invention. In the drawings:

Figure 1 shows in vertical section an electrical storage battery before it is started by actuation of the device of this invention;

Figure 2 is another vertical section showing a modified embodiment of the storage battery in the same initial conditions; and Figure 3 is a fragmentary vertical section showing the lower portion of the chamber of the device of this invention, wherein the orifices through which the electrolyte is supplied to the battery cells extend parallel to the axis of the chamber, whereas in Figs. 1 and 2 these orifices are disposed at right angles to this axis.

Referring first to Fig. 1, the improved battery, equipped with the starter device of this invention, comprises essentially an insulating case 1 of Bakelite, plastic or other insulating material, of any suitable shape, formed with a central chamber 2 of any desired cross-section (round, square, rectangular, etc.) communicating through orifices 4 with the battery cells shown at 3, these orifices being preferably countersunk on the chamber side.

In this chamber 2 is slidably fitted a piston assembly 5 provided with a peripheral piston ring 5b ensuring a sealing engagement between the piston and the inner wall of the cylinder-forming chamber 2. This piston 5 has formed centrally thereof an aperture closed on the one side by a thin diaphragm 6 of moderate mechanical strength but sufficient fluid tightness and on the other side by a grid member 7 adapted to retain any fragments of the diaphragm 6, if necessary. A rigid-bottomed cover 8 formed with flexible peripheral flanges is sealed to the piston 5 to constitute a fluid-tight container for the electrolyte 9. On the underside of the piston 5, a small quantity of grease 10 of sufficient viscosity is retained by the flange-forming member 11 which, due to the capillarity of the grease, are not required to be in frictional engagement with the inner wall of the chamber 2. A compression spring 12 is normally kept in its loaded condition between the rigid cover 8 and the underside of the top wall of the battery case. A dished or substantially dome-shaped member 13, preferably of flexible material, may be provided in the bottom of the chamber 2 to improve the distribution of the grease upon completion of the starting process, as will be made clear presently. Baffle means 14 are provided for venting the air from the mattery cells 3 as the latter are being filled with the electrolyte. In the inoperative condition of the device, the piston assembly is held in its uppermost position by a suitable retaining pin G threaded through a hole formed in the upper portion of a rod emerging from the top of the battery case and having its lower end sealed to the cover bottom 8.

This assembly operates as follows:

When the pin G is removed, the piston assembly is released and the spring 12 urges the rigid cover face 8 downwards. As the frictional engagement between the piston 5 and the inner wall of the chamber provides a resistance greater than the force required for bursting the diaphragm 6 (a locking pawl or any other adequate retaining means being provided to this end, if desired), the diaphragm will be burst by the electrolyte pressure built up in turn by the spring pressure. Thus, the electrolyte is forced into and fills the chamber 2, and as the cover 8 continues its downward movement under the influence of the compression spring 12 it finally engages the piston 5. Thereafter, the piston assembly will force the electrolyte through the orifices 4 into the battery cells, this distribution taking place in a regular, uniform manner. At the lower end of its travel, the piston 5 causes the flange-forming member 11 to be pressed between the piston 5 and the dished or substantially dome-shaped member 13, so that the member 11 is moved toward the piston 5 and squeezes the grease 10 out through the orifices 4. Of course, the diameter of these orifices and the grease viscosity are so selected that under a predetermined pressure the grease will definitely choke these orifices.

As already stated, the orifices 4 are preferably countersunk on the chamber side to facilitate the penetration of the grease therein. During the battery starting operation, the air contained in the battery cells 3 is vented through the baffle means 14 which, on the other hand, are of such known design as to prevent the passage of the electrolyte therethrough. Besides, any fragments of the burst diaphragm that may separate during the starting operation are retained by the grid member 7 to prevent them from choking the orifices 4.

A modified embodiment of the piston assembly is illustrated in Fig. 2 of the drawings.

The case 1, chamber 2, battery cells 3 and orifices 4 are of same design as in the first embodiment. The piston 5' is hollow and has piston rings 5b'. The piston 5' constitutes another chamber in which is slidably fitted another piston 8' having a piston ring 8b. Thus, the electrolyte 9 is trapped within the piston 5' by the piston 8'. A plug 7bis is provided to obturate the hole 6 formed as in the preceding embodiment centrally of the piston. This plug is connected through a non-extensible but flexible wire or rod 15 to the piston 8', as shown, and a conical helical spring 16 urges the piston against the electrolyte 9. A rod 17 adapted to be broken holds the piston 8' at a predetermined distance from the upper wall of the case, and a diaphragm 18 seals the upper portion of the piston. Besides, the piston 5' is retained in its initial position by a pin G. The grease 10, flange-forming member 11, dished member 13 and baffle means 14 are maintained in this embodiment.

This assembly operates as follows:

When the pin G is removed, the spring 12 exerts a relatively strong pressure on the piston 5' which is thus moved downwards.

As the piston 8' is retained by the rod 17, it remains stationary and the piston 5' continues its downward movement until it engages the piston 8'. The plug 7bis, also retained against the piston 8', is removed from the hole 6. At this time, the piston 5', still urged by the spring 12, drives the complete piston assembly and the rod 17 is broken or released, whereby the piston assembly, urged by the spring 12, may continue its downward travel during which the other spring 16 causes the piston 8' to force the electrolyte through the hole 6, as the plug 7bis is drawn sidewise by the bent wire 15.

As the piston assembly moves downwards the electrolyte fills up the battery cells and when all the electrolyte has been expelled from the chamber 2 the grease 10 chokes the orifices 4 as in the preceding example shown in Fig. 1. The diaphragm 18 disposed above the spring 16 will seal the upper face of the piston, thereby preventing any undesired initiation of the battery operation as long as the battery is kept in stock.

In the other modified embodiment shown in Fig. 3, the orifices 4 to be filled with or choked by the grease 10 are parallel to the chamber axis. In this case, the grease 10 is retained against the underside of the piston 5" by a flexible wire-gauze element 11bis of which the apertures (of round, square, or other suitable configuration) are of such dimensions that under normal pressure conditions the grease is retained by its capillarity.

This modified embodiment operates as follows:

When the piston forcing the electrolyte through the orifices 4 has nearly completed its stroke the pressure applied by the spring 12 is sufficient to squeeze the wire gauze element 11bis and force the grease out of it and into the orifices 4 to choke them and thus prevent the electrolyte from flowing back from the cells 3.

It will be obvious to those skilled in the art that various changes may be made in the invention without departing from the spirit and scope thereof and therefore the invention is not limited to the few embodiments shown in the drawings and described in the specification but only as indicated in the appended claims.

I claim:

1. A starter device for an electrical storage battery which comprises an insulating case having a chamber formed at its bottom with a plurality of orifices communicating freely with the various cells of the battery provided in the case, a fluid tight container slidably disposed within the chamber and housing a supply of electrolyte, said container having a hand-actuatable retaining member and being constantly urged by spring means towards the bottom of said chamber, the wall of said container on the spring side constituting a piston and the opposite wall having a normally closed aperture for discharging the electrolyte from the container, said opposite wall carrying on its outer face a certain quantity of grease, said spring means having a force sufficient to sequentially open said normally closed aperture, force said electrolyte out from said container and into said cells, and fill said orifices with said grease, the viscosity of said grease being sufficient to choke said orifice when all the electrolyte has been transferred from said container to said cells.

2. A starter device according to claim 1, wherein the piston-forming wall of said container is urged by a pre-loaded spring and provided with a rod extending through the relevant wall of said chamber and adapted to receive a retaining pin thereacross, that wall of said container which is parallel to the chamber axis being flexible, the electrolyte distributing aperture being closed by a flexible diaphragm of a strength inferior to that required for overcoming the frictional engagement between said container and said chamber.

3. A starter device according to claim 1, wherein said container comprises a spring-loaded, piston-forming wall provided with a rod extending through the relevant wall of said chamber and adapted to receive a retaining pin thereacross, the container wall parallel to the chamber axis being flexible and the electrolyte distributing aperture closed by a flexible diaphragm of a strength inferior to that required for overcoming the frictional engagement between said container and said chamber.

4. A starter device according to claim 1, wherein said container comprises a spring-loaded wall engaging a piston slidably fitted in the cavity formed by said container, said piston being connected on the one side to the relevant wall of said chamber through a rod adapted to be broken or released when the battery operation is to be started, and on the other side to a plug normally obturating the electrolyte-distributing aperture through a flexible, non extensible wire, a pre-loaded spring engaging the rigid periphery of said spring-loaded wall and having a force greater than that of said spring-loaded wall to cause said piston rod to be broken or released subsequent to the squeezing of said spring-loaded wall when said container-retaining member is released.

5. A starter device according to claim 1, wherein said quantity of grease is located between said container and a bell-mouthed flange extending laterally to the side walls of said chamber in case the orifices for distributing the electrolyte to the battery cells at the bottom of said chamber extended in a lateral direction.

6. A starter device according to claim 1, wherein said quantity of grease is located within a flexible wire-gauze element carried by said container in case the orifices for distributing the electrolyte to the battery cells were parallel to the axis of motion of said container.

References Cited in the file of this patent

UNITED STATES PATENTS

| 325,120 | Sellon | Aug. 25, 1885 |
|---|---|---|
| 2,787,650 | Blaru | Apr. 2, 1957 |

FOREIGN PATENTS

| 1,087,673 | France | Nov. 20, 1953 |
|---|---|---|
| 1,096,846 | France | Feb. 9, 1955 |
| 66,142 | France | Jan. 30, 1956 |